United States Patent
Dupuis et al.

(10) Patent No.: US 7,469,763 B2
(45) Date of Patent: Dec. 30, 2008

(54) INTEGRAL ENGINE UTILITY ASSEMBLY FOR AN AUTOMOTIVE VEHICLE HAVING A BATTERY TRAY, COOLANT RESERVOIR AND VACUUM RESERVOIR

(75) Inventors: Larry Dupuis, Grosse Ile, MI (US); Paul Lee Luskin, Canton, MI (US); Michael John Lang, Marysville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 11/307,195

(22) Filed: Jan. 26, 2006

(65) Prior Publication Data
US 2007/0169974 A1   Jul. 26, 2007

(51) Int. Cl.
*B60R 16/04* (2006.01)
(52) U.S. Cl. .................. 180/68.5; 429/100; 123/198 E; 224/902

(58) Field of Classification Search ................ 180/68.5; 429/100; 123/198 E; 224/902
See application file for complete search history.

(56) References Cited

U.S. PATENT DOCUMENTS

| | | | | |
|---|---|---|---|---|
| 4,976,327 A * | 12/1990 | Abujudom et al. | ......... | 180/68.2 |
| 5,547,036 A * | 8/1996 | Gawaskar et al. | .......... | 180/68.5 |
| 5,636,701 A * | 6/1997 | Norman et al. | ............ | 180/68.5 |
| 6,247,442 B1 * | 6/2001 | Bedard et al. | ............ | 123/198 E |
| 6,340,538 B1 * | 1/2002 | King | ........................... | 429/96 |
| 6,439,329 B1 * | 8/2002 | Vaishnav et al. | ............ | 180/68.5 |
| 2003/0047366 A1 * | 3/2003 | Andrew et al. | ............. | 180/68.5 |
| 2003/0080271 A1 | 5/2003 | Haves | | |
| 2004/0142232 A1 * | 7/2004 | Risca et al. | ................. | 429/100 |

* cited by examiner

*Primary Examiner*—Christopher P Ellis
*Assistant Examiner*—Katy Meyer
(74) *Attorney, Agent, or Firm*—Dickinson Wright PLLC; Greg Brown

(57) ABSTRACT

An integral assembly for an automotive vehicle includes a battery tray, a coolant reservoir and a vacuum reservoir. The battery tray and portions of the coolant reservoir and vacuum reservoir are formed as a single molded part having shared partition walls, so as to provide superior strength, economy, and packaging efficiency.

2 Claims, 3 Drawing Sheets

INTEGRAL ENGINE UTILITY ASSEMBLY FOR AN AUTOMOTIVE VEHICLE HAVING A BATTERY TRAY, COOLANT RESERVOIR AND VACUUM RESERVOIR

TECHNICAL FIELD

The present invention relates to a combination structure for holding not only a storage battery of an automotive vehicle, but also for providing reservoirs for coolant and vacuum.

BACKGROUND

Designers of automotive vehicle componentry have attempted to combine storage battery trays with other utilities. U.S. Pat. No. 5,636,701 discloses a combination battery tray and vacuum reservoir. Unfortunately, the device of the '701 patent does not represent an optimal use of space in the engine compartment because the vacuum reservoir is cantilevered from the battery tray and extends into the engine compartment of the vehicle. U.S. Pat. No. 6,439,329 discloses a battery tray and reservoir assembly in which a vacuum reservoir is located behind a back wall of the battery tray. This severely restricts the volume of the vacuum chamber, presents an issue as to sealing the chamber itself because of the long length of the seal, and impairs the package efficiency of the assembly because the stacked placement of the vacuum reservoir increases the extent to which the assembly extends into the engine compartment.

An integral battery tray, coolant reservoir and vacuum reservoir according to the present invention solves the problems associated with prior art devices while combining three separate items needed within an engine compartment of a vehicle, but with minimal expenditure of space, material, and complexity, including the number of parts incorporated in the assembly.

SUMMARY

An integral assembly for an automotive vehicle includes a battery tray, a coolant reservoir and a vacuum reservoir. A mounting plate attaches integral assembly to an engine compartment structure of the vehicle. The battery tray is formed integrally, preferably by injection molding, with a mounting plate and has sidewalls and a floor extending from the mounting plate such that the mounting plate functions as one wall of the battery tray. A coolant reservoir has a lower portion formed integrally with the mounting plate. This lower portion of the cooling reservoir is supported by the mounting plate and by one of the sidewalls of the battery tray. Finally, vacuum reservoir has an upper portion formed integrally with the floor of the battery tray, such that the vacuum reservoir is supported by the battery tray and the mounting plate. An upper portion of the coolant reservoir is attached to the lower portion of the reservoir, preferably by welding. Those skilled in the art will appreciate in view of this disclosure that the upper portion of the coolant reservoir may be bonded to the lower portion by means of adhesive bonding, or by use of threaded fasteners, or by other methods known to those skilled in the art and suggested by this disclosure.

The lower portion of the vacuum reservoir is attached to the upper portion of the reservoir, by bonding, welding, by discrete fasteners, or other means known to those skilled in the art and suggested by this disclosure.

The present unit has excellent structural integrity which is buttressed by reinforcing ribs extending from the lower portion of the coolant reservoir to a battery tray sidewall supporting the coolant reservoir, as well as by reinforcing ribs extending from the coolant reservoir to the assembly's mounting plate. The mounting plate is itself strengthened by means of a number of reinforcing ribs which back the mounting plate.

It is an advantage of an integral battery tray and reservoir assembly according to the present invention that minimal space is required within the otherwise crowded engine compartment of the vehicle to accommodate three separate utilities provided by this assembly.

It is a further advantage of the present invention that the vertical integration of the battery tray and vacuum reservoir may be employed to utilize more fully the relatively greater vertical dimension of light truck and SUV engine compartments.

It is a further advantage of a system according to the present invention that judicious use of reinforcing ribs allows the assembly to have excellent strength, even at the extremes of temperature found within vehicle engine compartments.

Other advantages, as well as features and objects of the present invention, will become apparent to the reader of this specification.

DETAILED DESCRIPTION OF THE PREFERRED EMBODIMENTS

Figure 1:
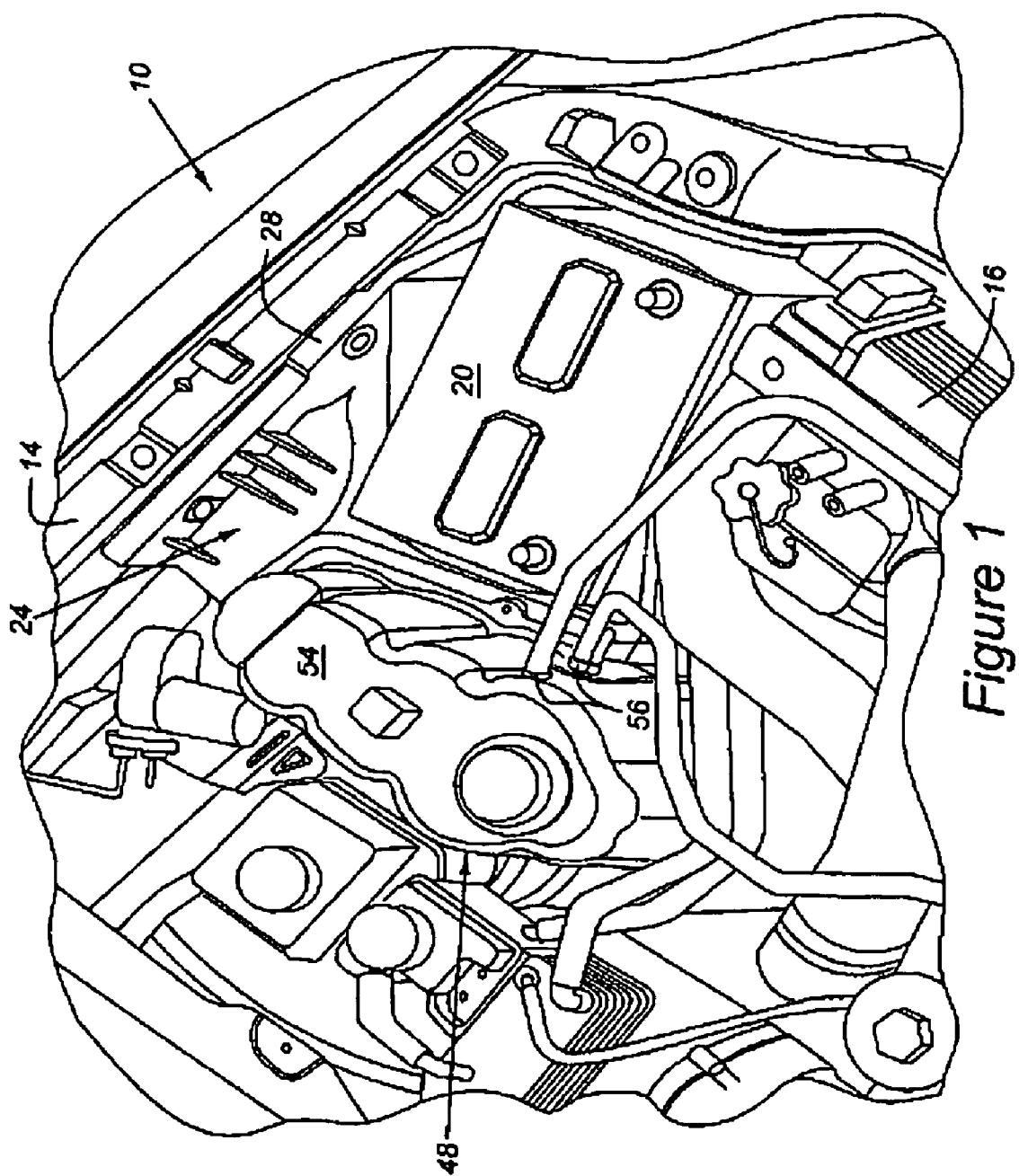
FIG. 1 is a perspective view of a vehicle engine compartment, including present multi-function integral engine utility assembly.

As shown in FIG. 1, vehicle engine compartment 10 includes integral assembly 24, which is attached at least in part to either fender apron 14, or to another structure adjacent engine compartment 10. Battery 20 is carried within integral assembly 24, which also includes coolant reservoir 48 and vacuum reservoir 60 (not shown in FIG. 1).

Figure 2:
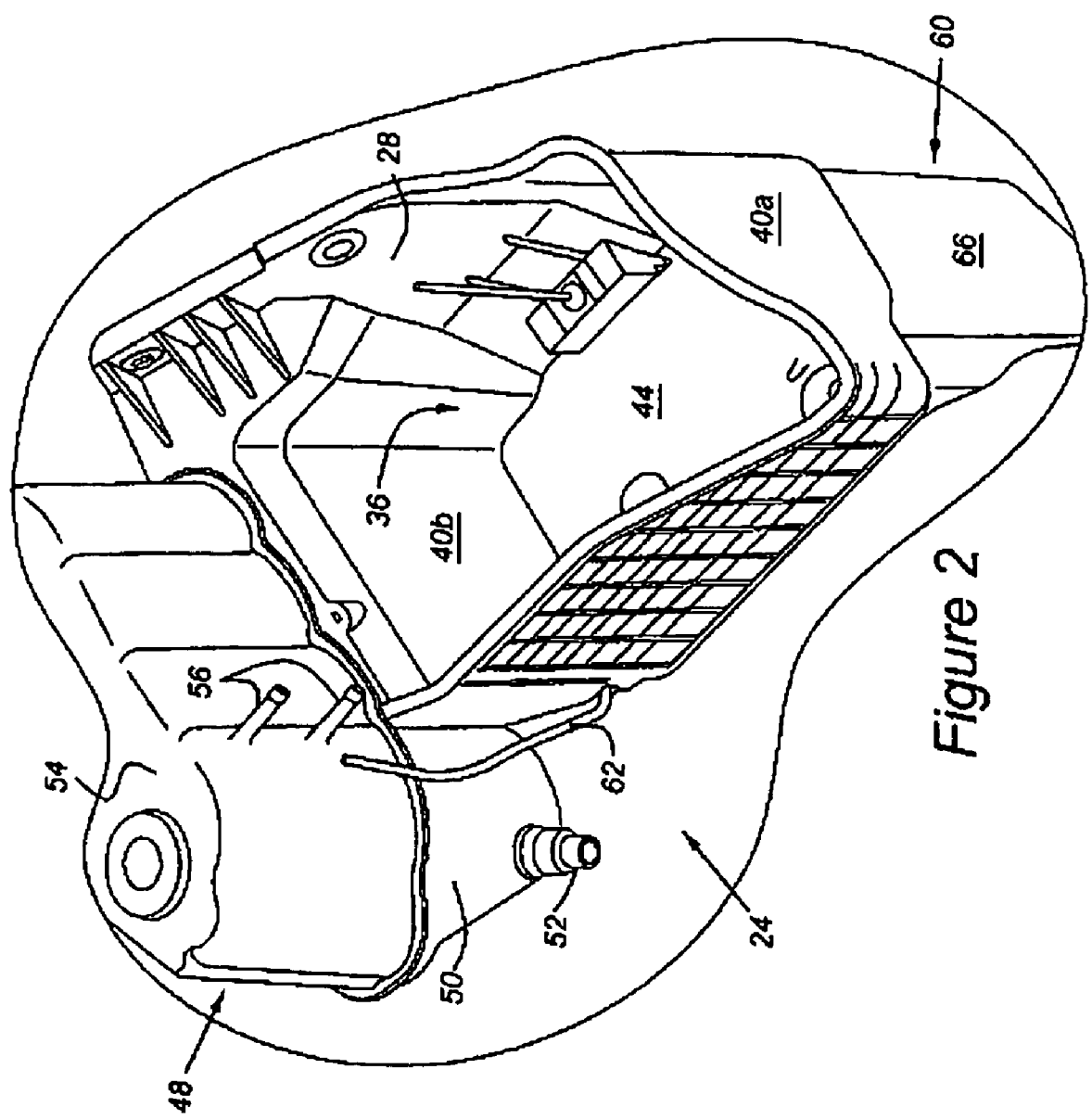
FIG. 2 is a perspective view of a multi-function integral assembly according to the present invention.
Figure 3:
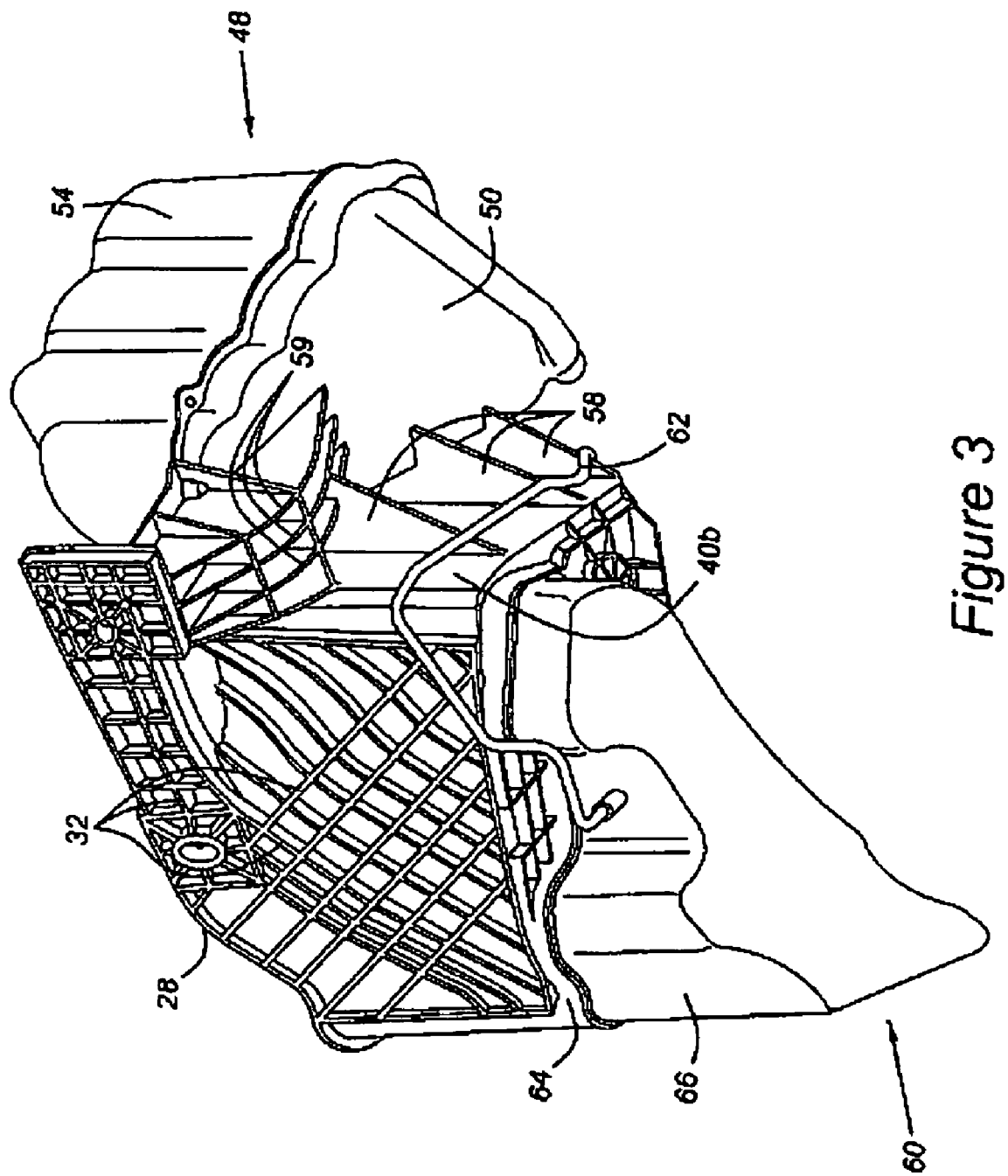
FIG. 3 is similar to FIG. 2 but is a rear perspective view of a multi-function assembly according to the present invention.

FIG. 2 shows integral assembly 24 without battery 20 being mounted therein. Mounting plate 28 is adapted for attachment either to fender apron 14, or to another structure such as a frame shotgun (not shown), which may include an assembly of hydroformed tubes. Mounting plate 28 is backed by a series of integral ribs, 32 (FIG. 3). This gives mounting plate 28 sufficient strength to function as a sole mounting device for integral assembly 24. This renders the task of mounting integral assembly an easier task than would otherwise be the case were other mounting points required.

Battery tray 36 includes floor 44 which extends from mounting plate 28, and sidewalls 40 which demarcate the fore and aft ends of floor 44. Note herein that because floor 44 extends from mounting plate 28, the mounting plate functions as one wall of battery tray 36.

Coolant reservoir 48 includes lower portion 50 which is formed integrally with mounting plate 28 and adjacent sidewall 40b. Lower portion 50 is therefore supported by adjacent sidewall 40b and by mounting plate 28. As shown in FIG. 3, a series of ribs, 58, extend between lower reservoir 50 and adjoining sidewall 40b. A second series of ribs, 59, extend between lower reservoir 50 and mounting plate 28. These ribs serve to greatly stiffen the mounting of lower coolant reservoir 50 to the balance of the integral assembly.

Coolant reservoir 48 also includes upper portion 54, which, as noted above, may be either welded, or otherwise bonded, or attached by other types of fastening to lower portion 50 of coolant reservoir 48. The lower portion 50 of coolant reservoir 48 also includes outlet 52, whereas the upper portion 54 of reservoir 48 includes two outlets or connectors 56. Those skilled in the art will appreciate in view of this disclosure that the number, location and size of the connectors 52 and 56 is committed to the discretion of one choosing to employ a system according to the present invention.

Vacuum reservoir 60, which is shown in FIGS. 2 and 3, has an upper portion 64 (FIG. 3), which is formed integrally with floor 44 of battery tray 36. Note that the upper portion 64 of reservoir 60, and indeed, the entirety of reservoir 60, including lower portion 66, are entirely overlaid by floor 44. Thus, vacuum reservoir 60 requires no additional space when determining the plan view space requirements of equipment within an engine compartment 10.

Lower portion 66 of vacuum reservoir 60 has vacuum line 62 attached thereto, which is plumbed to the vacuum system of the vehicle (not shown).

The present integral assembly is preferably molded from polypropylene, and more preferably, glass-filled polypropylene, having glass filling in the range of 25 to 35 percent. Glass-filled polypropylene has been found to provide the necessary strength for the present device, particularly when employed in engine compartments subject to both high and low ambient temperatures.

While particular embodiments of the invention have been shown and described, numerous variations and alternate embodiments will occur to those skilled in the art. Accordingly, it is intended that the invention be limited only in terms of the appended claims.

What is claimed is:

1. An integral assembly having a battery tray, coolant reservoir, and vacuum reservoir for an automotive vehicle, comprising:
    a mounting plate for attaching said integral assembly to an engine compartment structure of an automotive vehicle;
    a generally rectangular battery tray formed integrally with said mounting plate, with said battery tray having a plurality of sidewalls and a floor extending from said mounting plate such that said mounting plate comprises an additional wall of said battery tray;
    a coolant reservoir having a lower portion formed integrally with said mounting plate, and with said lower portion being supported by said mounting plate and by a shared partition wall comprising one of said sidewalls of said battery tray, and with said coolant reservoir further being supported by ribs extending to said reservoir from said mounting plate and said one of said sidewalls, and with said coolant reservoir further comprising an upper portion attached to said lower portion;
    and a vacuum reservoir having an upper portion formed integrally with said floor of said battery tray such that said upper portion of said vacuum reservoir is overlaid entirely by said shared floor of said battery tray, and with said vacuum reservoir further comprising a lower portion attached to said upper portion of said vacuum reservoir such that said vacuum reservoir is supported by said battery tray and said mounting plate.

2. An integral assembly according to claim 1, wherein said integral assembly is attached at least in part to a fender apron of an automotive vehicle.

* * * * *